United States Patent
Kobayashi et al.

(10) Patent No.: US 6,756,899 B2
(45) Date of Patent: Jun. 29, 2004

(54) PORTABLE COMMUNICATION TERMINAL AND COMMUNICATION METHOD, ANTITHEFT APPARATUS AND ANTITHEFT METHOD, AND ANTITHEFT SYSTEM

(75) Inventors: Hideyuki Kobayashi, Kyoto (JP); Tanichi Ando, Kyoto (JP); Shinichi Mukaigawa, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/993,882

(22) Filed: Nov. 27, 2001

(65) Prior Publication Data

US 2002/0080015 A1 Jun. 27, 2002

(30) Foreign Application Priority Data

Nov. 28, 2000 (JP) ........................................ 2000-360473

(51) Int. Cl.$^7$ ................................................. G08B 1/08
(52) U.S. Cl. .............................. 340/539.1; 340/539.13; 340/426.1; 340/426.15; 340/539.11
(58) Field of Search .......................... 340/425.5–426.1, 340/426.13–426.15, 426.16, 426.17, 539.1–539.11

(56) References Cited

U.S. PATENT DOCUMENTS

| | | | | |
|---|---|---|---|---|
| 4,809,316 A | * | 2/1989 | Namekawa | ................... 379/58 |
| 6,337,621 B1 | * | 1/2002 | Ogino et al. | ............. 340/425.5 |
| 6,411,217 B1 | * | 6/2002 | Gabbard | ................ 340/825.31 |
| 6,452,483 B2 | * | 9/2002 | Chen et al. | .............. 340/425.5 |
| 6,480,098 B2 | * | 11/2002 | Flick | .......................... 340/7.2 |

FOREIGN PATENT DOCUMENTS

JP 10-208132 A 8/1998

* cited by examiner

Primary Examiner—Daryl Pope
(74) Attorney, Agent, or Firm—Foley & Lardner (57) ABSTRACT

It is possible to certainly prevent a vehicle from being stolen at low cost. A user of an automobile 31 registers an on or off state of a security mode with a center apparatus 33 in advance. When abnormality is detected by a sensor 41, the abnormality is notified to a center communication device 52 from an on-vehicle communication device 43 through a communication network 34. When the security mode is on, a center control device 51 notifies the abnormality to a portable telephone 32 of the user of the automobile 31 through the communication network 34.

8 Claims, 10 Drawing Sheets

PORTABLE COMMUNICATION TERMINAL AND COMMUNICATION METHOD, ANTITHEFT APPARATUS AND ANTITHEFT METHOD, AND ANTITHEFT SYSTEM

BACKGROUND OF THE INVENTION

1. Field of the Invention

The present invention relates to a portable communication terminal and a communication method, an antitheft apparatus and an antitheft method, and an antitheft system, and particularly to a portable communication terminal and a communication method, an antitheft apparatus and an antitheft method, and an antitheft system, in which it is possible to more certainly prevent a vehicle from being stolen.

2. Description of the Related Art

Figure 1:
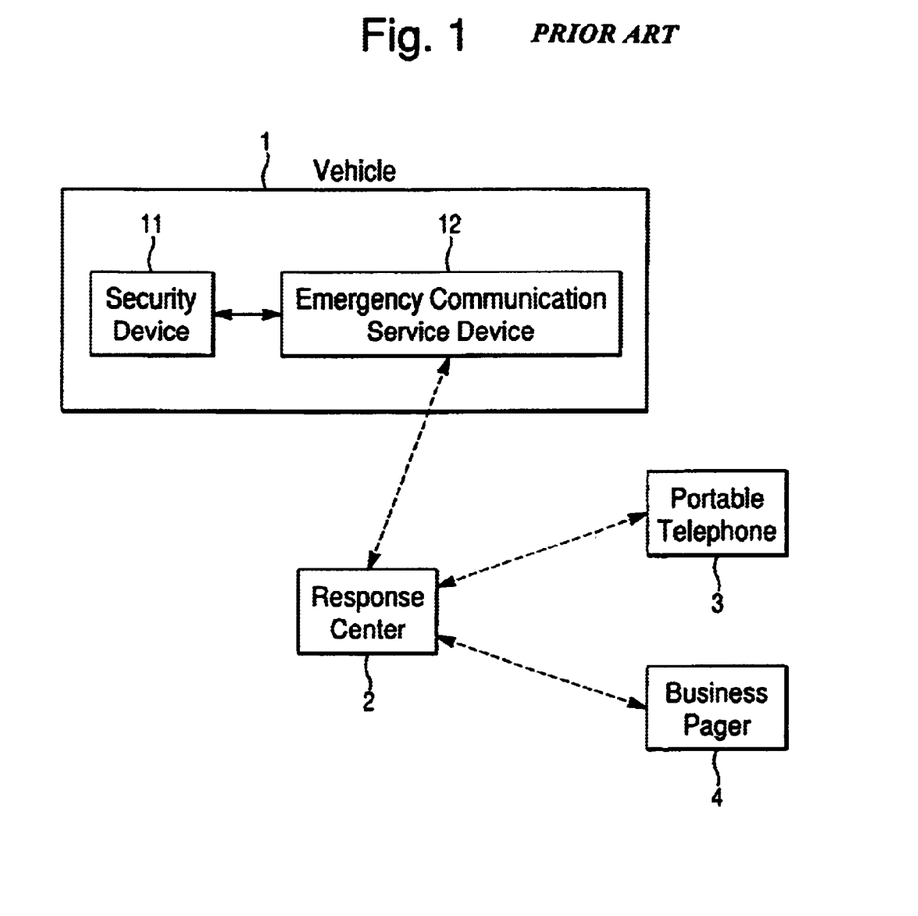
FIG. 1 is a block diagram showing a structural example of a conventional antitheft system.

Recently, because of the frequent theft of vehicles, it is demanded by society to prevent the theft of vehicles. Such a vehicle antitheft system is disclosed in, for example, Japanese Patent Laid-Open No. 2000-52932. The antitheft system proposed in the publication is constructed, for example, as shown in FIG. 1.

A vehicle 1 includes a security device 11 and an emergency communication service device 12. In the case where the security device 11 detects, for example, the opening of a door of the vehicle 1, that is notified to the emergency communication service device 12.

When receiving an abnormality detection signal like this from the security device 11, the emergency communication service device 12 communicates that to a response center 2 by wireless.

When receiving, from the emergency communication service device 12, notification that abnormality is detected, the response center 2 notifies that to a portable telephone 3 of a user of the vehicle 1 or a business pager 4. By this, the user of the vehicle 1 can know that the abnormality occurs in the vehicle 1, and the user confirms safety by, for example, going to a place where the vehicle 1 is parked.

However, in such an antitheft system, when abnormality is detected, the security device 11 detects this and notifies the portable telephone 3 or the business pager 4 through the response center 2 that the abnormality is detected, so that there has been a problem that for example, in the case where a thief cancels a security mode of the security device 11, it becomes impossible to prevent the vehicle 1 from being stolen.

SUMMARY OF THE INVENTION

The present invention has been made in view of such circumstances, and an object thereof is to more certainly prevent a vehicle from being stolen.

A portable communication terminal of the present invention comprises access means for accessing a center apparatus for taking charge of a vehicle against theft, and instruction means for instructing the center apparatus to register a mode of taking charge of the vehicle against theft.

The portable communication terminal may further comprise reception means for receiving notification of abnormality from the center apparatus.

Figure 2:
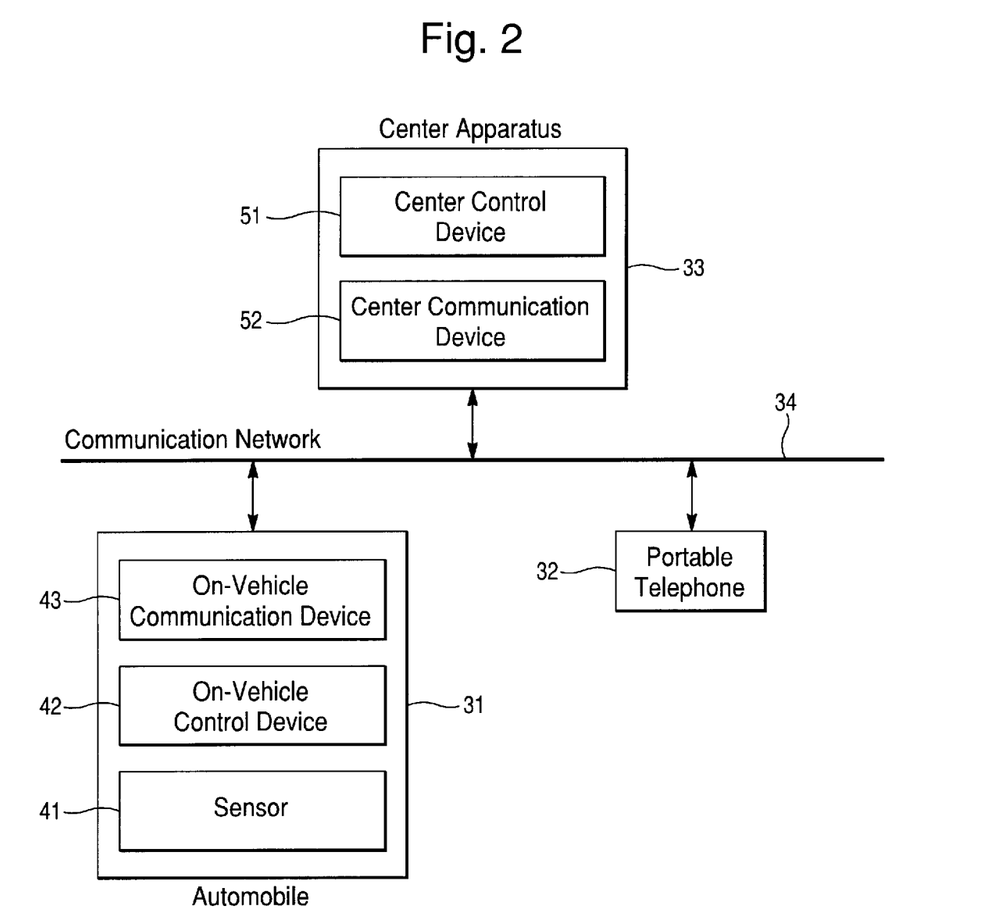
FIG. 2 is a block diagram showing a structural example of an antitheft system of the present invention.

For example, this portable communication terminal is constructed by a portable telephone 32 of FIG. 2, and in addition, it is constructed by a PHS (Personal Handyphone), a PDA (Personal Digital Assistants) or the like. The center apparatus is constructed by a center apparatus 33. Further, the vehicle is constructed by an automobile 31 of FIG. 2, and this vehicle also includes a passenger car, a truck, a bus, a motorcycle, a bicycle, and the like.

Figure 5:
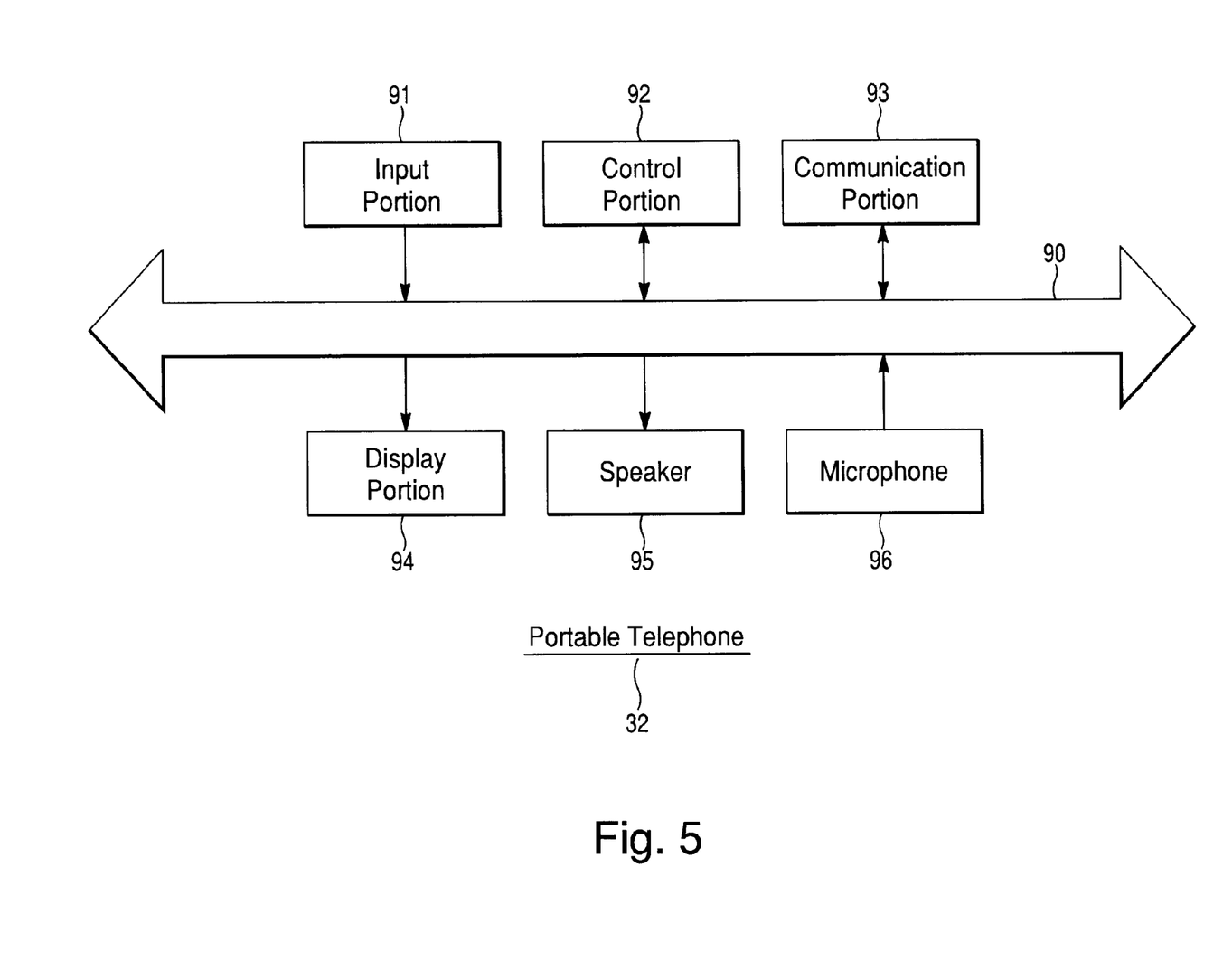
FIG. 5 is a block diagram showing a structural example of a portable telephone of FIG. 2.
Figure 6:
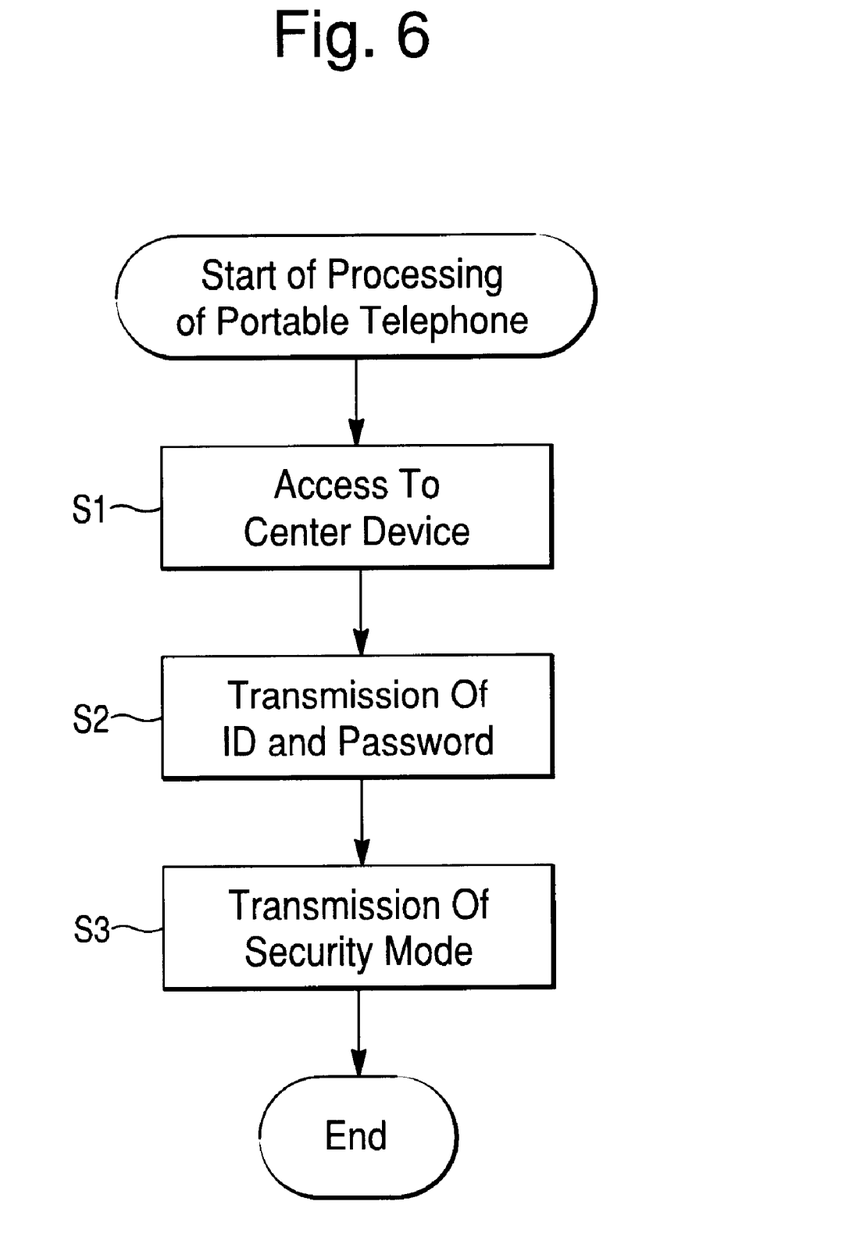
FIG. 6 is a flowchart for explaining the operation of the portable telephone of FIG. 2.

The access means is constructed by a control portion 92 of FIG. 5 which executes, for example, a processing of step S1 of FIG. 6. The instruction means is constructed by the control portion 92 of FIG. 5 which executes, for example, a processing of step S3 of FIG. 6.

Figure 11:
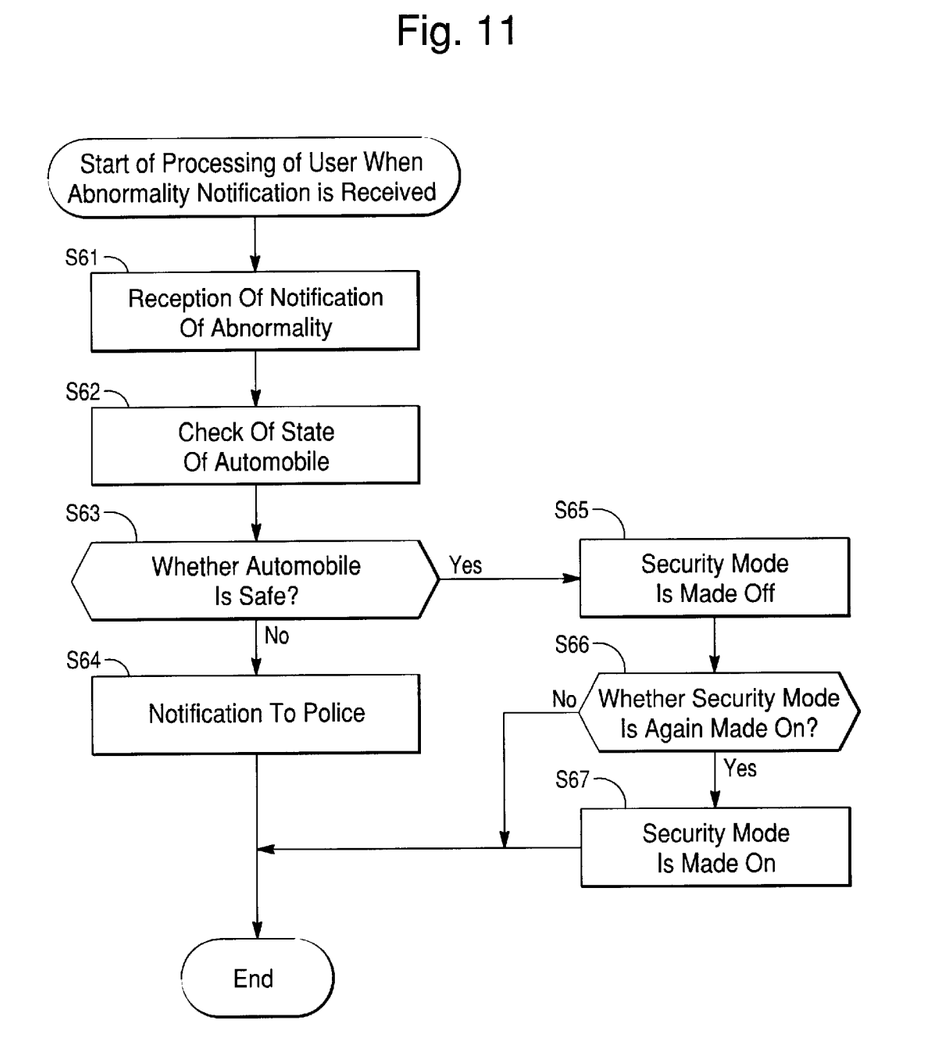
FIG. 11 is a flowchart for explaining a processing in the case where a user of the automobile of FIG. 2 receives abnormality notification.

The reception means is constructed by the control portion 92 of FIG. 5 which executes, for example, a processing of step S61 of FIG. 11.

A communication method of the present invention comprises an access step of accessing a center apparatus for taking charge of a vehicle against theft, and an instruction step of instructing the center apparatus to register a mode of taking charge of the vehicle against theft.

The access step is constructed by, for example, step S1 of FIG. 6, and the instruction step is constructed by step S3.

In the portable communication terminal and the communication method of the present invention, the center apparatus is instructed to register the mode of taking charge of the vehicle against theft. Accordingly, it becomes possible to certainly prevent the vehicle from being stolen.

An antitheft apparatus of the present invention comprises first reception means for receiving a request for registration of a mode of taking charge of a vehicle against theft, registration means for registering the mode on the basis of the request received by the first reception means, second reception means for receiving an abnormality detection signal from the vehicle, judgement means for judging the mode registered in the registration means when the second reception means receives the abnormality detection signal, and notification means for notifying a user of abnormality on the basis of a judgement result by the judgement means.

The antitheft apparatus may further comprise detection means which communicates with a communication device installed in the vehicle at a predetermined period and detects a state of the vehicle.

This antitheft apparatus is constructed by, for example, a center apparatus 33 of FIG. 2.

Figure 4:
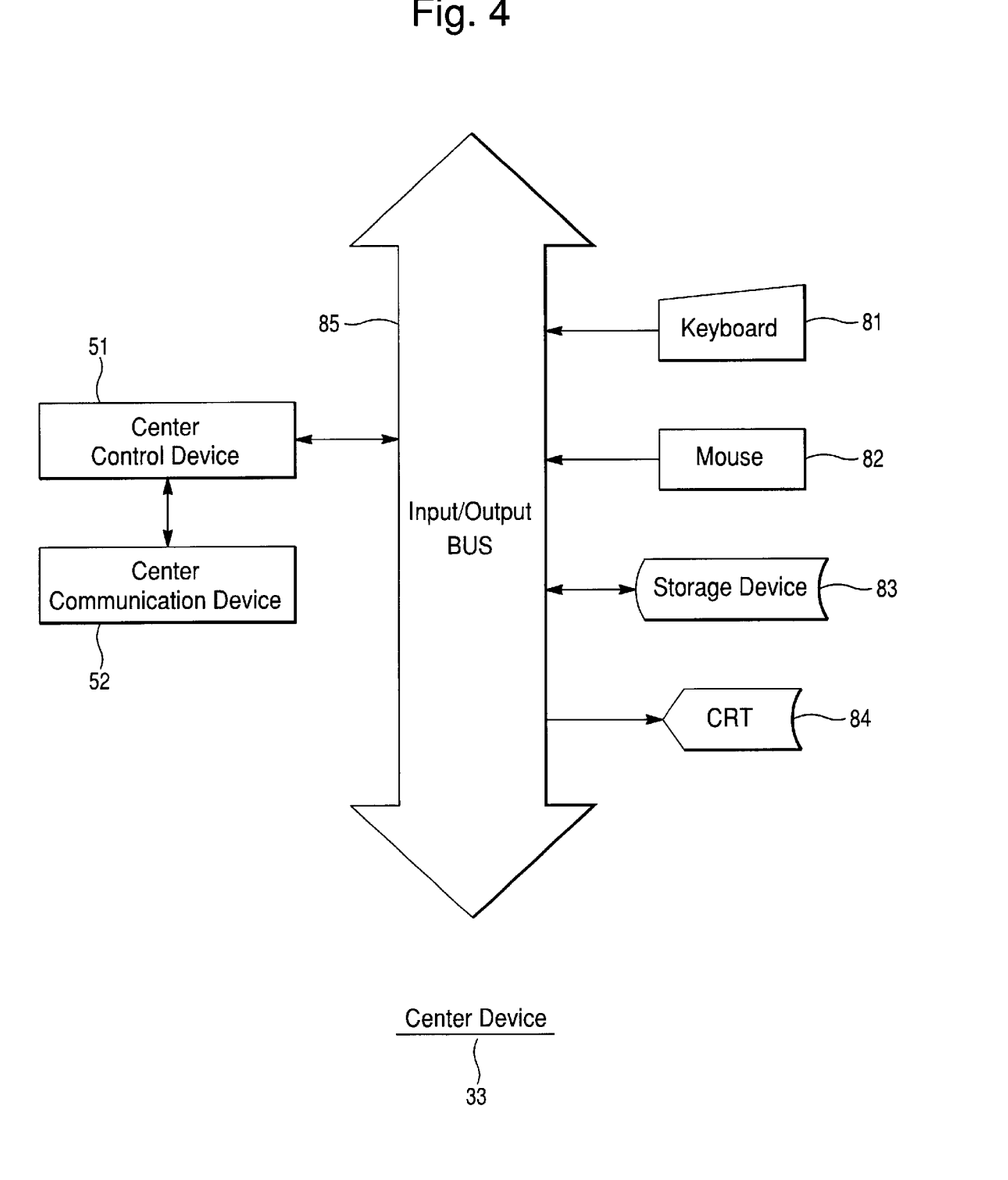
FIG. 4 is a block diagram showing a structural example of a center apparatus of FIG. 2.
Figure 7:
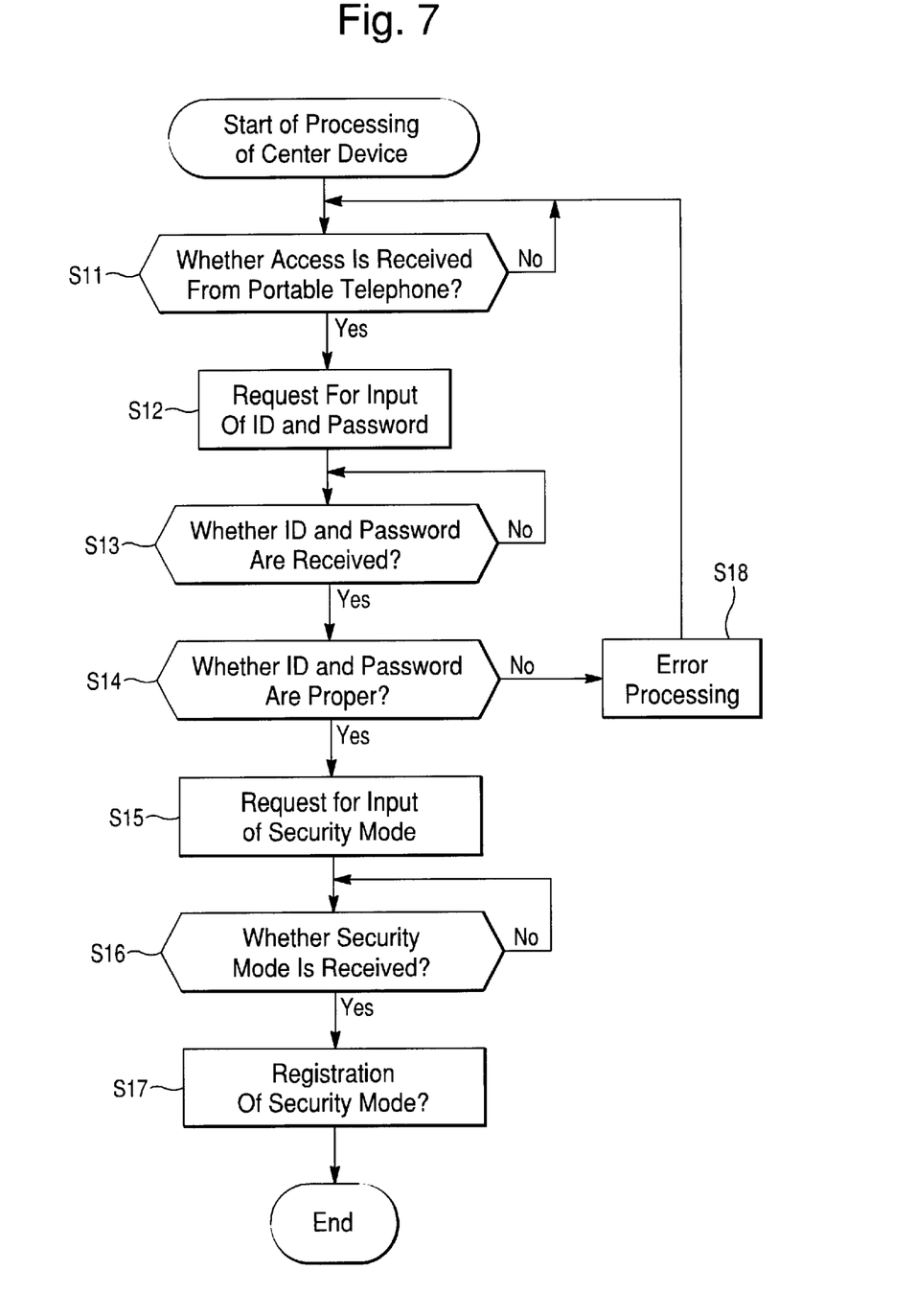
FIG. 7 is a flowchart for explaining the operation of the center apparatus of FIG. 2.
Figure 10:
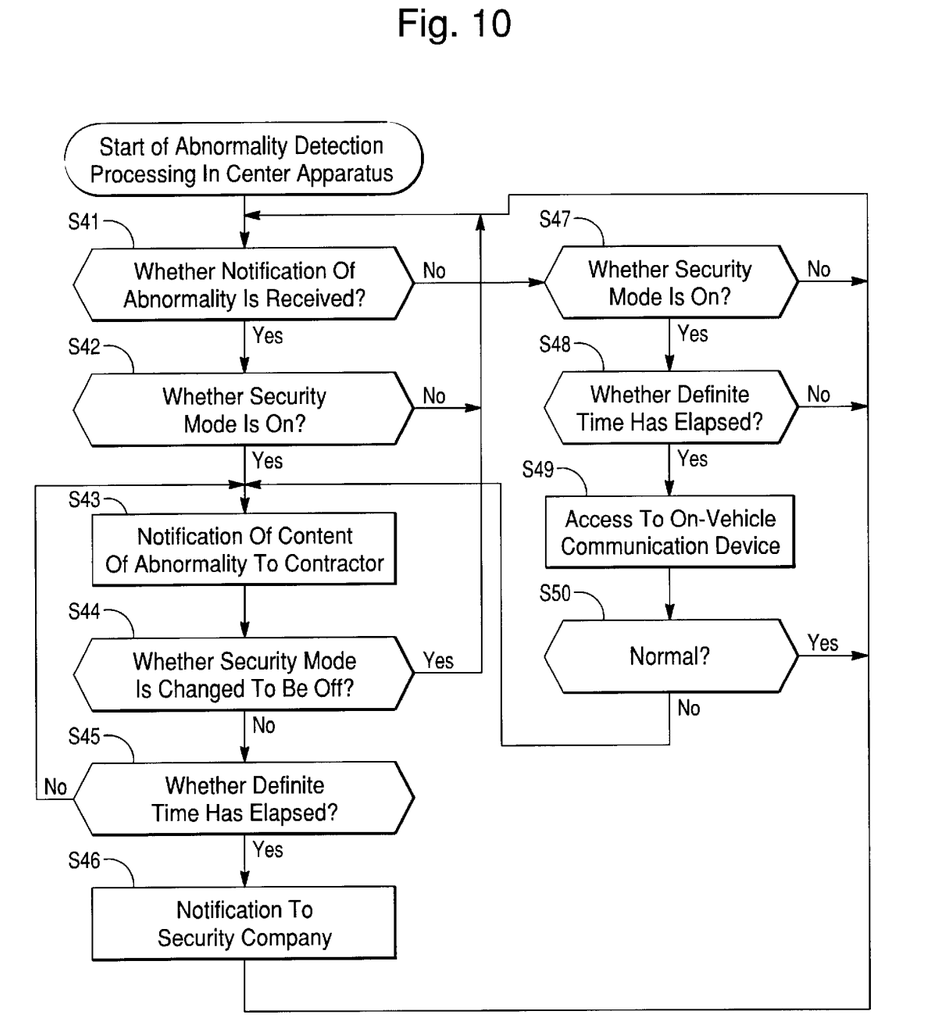
FIG. 10 is a flowchart for explaining an abnormality detection processing in the center apparatus of FIG. 2.

For example, the first reception means is constructed by a center control device 51 of FIG. 4 which executes a processing of step S11 of FIG. 7, the registration means is constructed by a storage device 83 of FIG. 4, the second reception means is constructed by the center control device 51 of FIG. 4 which executes a processing of step S41 of FIG. 10, the judgement means is constructed by the center control device 51 of FIG. 4 which executes a processing of step S42 of FIG. 10, and the notification means is constructed by the center control device 51 of FIG. 4 which executes a processing of step S43 of FIG. 10.

The detection means is constructed by the center control device 51 of FIG. 4 which executes, for example, processings of steps S48, S49 and S50 of FIG. 10.

An antitheft method of the present invention comprises a first reception step of receiving a request for registration of a mode of taking charge of a vehicle against theft, a registration step of registering the mode on the basis of the request received by a processing of the first reception step, a second reception step of receiving an abnormality detection signal from the vehicle, a judgement step of judging the mode registered by a processing of the registration step when the abnormality detection signal is received by a processing of the second reception step, and a notification step of notifying a user of abnormality on the basis of a judgement result by a processing of the judgement step.

For example, the first reception step is constructed by step S11 of FIG. 7, the registration step is constructed by step S17 of FIG. 7, the second reception step is constructed by step S41 of FIG. 10, the judgement step is constructed by step S42 of FIG. 10, and the notification step is constructed by step S43 of FIG. 10.

In the antitheft apparatus and the antitheft method of the present invention, the mode of taking charge of the vehicle against theft is registered on the basis of the request from the user. When the abnormality detection signal is received, the user is notified of the abnormality on the basis of the mode.

Accordingly, it becomes hard for a person other than the user to cancel the mode of taking charge of the vehicle against theft, and it is possible to provide the user with a service which can certainly prevent the vehicle from being stolen.

An antitheft system of the present invention is characterized in that a portable communication terminal comprises access means for accessing a center apparatus, and instruction means for instructing the center apparatus to register a mode of taking charge of a vehicle against theft, and the center apparatus comprises first reception means for receiving an instruction to register the mode from the instruction means, registration means for registering the mode on the basis of the instruction received by the first reception means, second reception means for receiving an abnormality detection signal from the vehicle, judgement means for judging the mode registered in the registration means when the second reception means receives the abnormality detection signal, and notification means for notifying the portable communication terminal of abnormality on the basis of a judgement result by the judgement means.

An antitheft method of the present invention is characterized in that an antitheft method of a portable communication terminal comprises an access step of accessing a center apparatus, and an instruction step of instructing the center apparatus to register a mode of taking charge of a vehicle against theft, and an antitheft method of the center apparatus comprises a first reception step of receiving an instruction to register the mode on the basis of a processing of the instruction step, a registration step of registering the mode on the basis of the instruction received at the first reception step, a second reception step of receiving an abnormality detection signal from the vehicle, a judgement step of judging the mode registered at the registration step when the abnormality detection signal is received at the second reception step, and a notification step of notifying the portable communication terminal of abnormality on the basis of a judgement result at the judgement step.

For example, the portable communication terminal is constructed by a portable telephone 32 of FIG. 2, and the center apparatus is constructed by a center apparatus 33 of FIG. 2.

For example, the access means is constructed by a control portion 92 of FIG. 5 which executes, for example, a processing of step S1 of FIG. 6, and the instruction means is constructed by the control portion 92 which executes, for example, a processing of step S3 of FIG. 6.

For example, the first reception means is constructed by a center control device 51 of FIG. 4 which executes a processing of step S11 of FIG. 7, the registration means is constructed by a storage device 83 of FIG. 4, the second reception means is constructed by the center control device 51 of FIG. 4 which executes a processing of step S41 of FIG. 10, the judgement means is constructed by the center control device 51 of FIG. 4 which executes a processing of step S42 of FIG. 10, and the notification means is constructed by the center control device 51 which executes a processing of step S43.

For example, the access step is constructed by, for example, step S1 of FIG. 6, and the instruction step is constructed by step S3 of FIG. 6.

For example, the first reception step is constructed by step S11 of FIG. 7, the registration step is constructed by step S17 of FIG. 7, the second reception step is constructed by step S41 of FIG. 10, the judgement step is constructed by step S42 of FIG. 10, and the notification step is constructed by step S43 of FIG. 10.

In the antitheft system and the antitheft method of the present invention, the center apparatus registers the mode of taking charge of the vehicle against theft on the basis of the request from the portable communication terminal. When the abnormality detection signal from the vehicle is received, the center apparatus notifies the portable communication terminal of the abnormality on the basis of the registered mode.

It becomes impossible for a person other than the user to cancel the mode, and it is possible to more certainly prevent the vehicle from being stolen. Besides, cost required for the user to that end can be made low.

DETAILED DESCRIPTION OF THE PREFERRED EMBODIMENTS

FIG. 2 shows a structural example of an antitheft system to which the present invention is applied. In this system, an on-vehicle communication device 43 of an automobile 31 is connected to a portable telephone 32 of a user of the automobile 31 and a center apparatus 33 through a communication network 34 including the Internet, a public line, and the like.

The automobile 31 is provided with, in addition to the on-vehicle communication device 43, a security device made of a sensor 41 for detecting abnormality of the automobile 31 and an on-vehicle control device 42 for controlling the operation of the sensor 41 and the on-vehicle communication device 43.

The center apparatus 33 is constructed by a center communication device 52 for communicating with the portable telephone 32 or the on-vehicle communication device 43 through the communication network 34, and a center control device 51 for controlling the operation of the center communication device 52.

Figure 3:
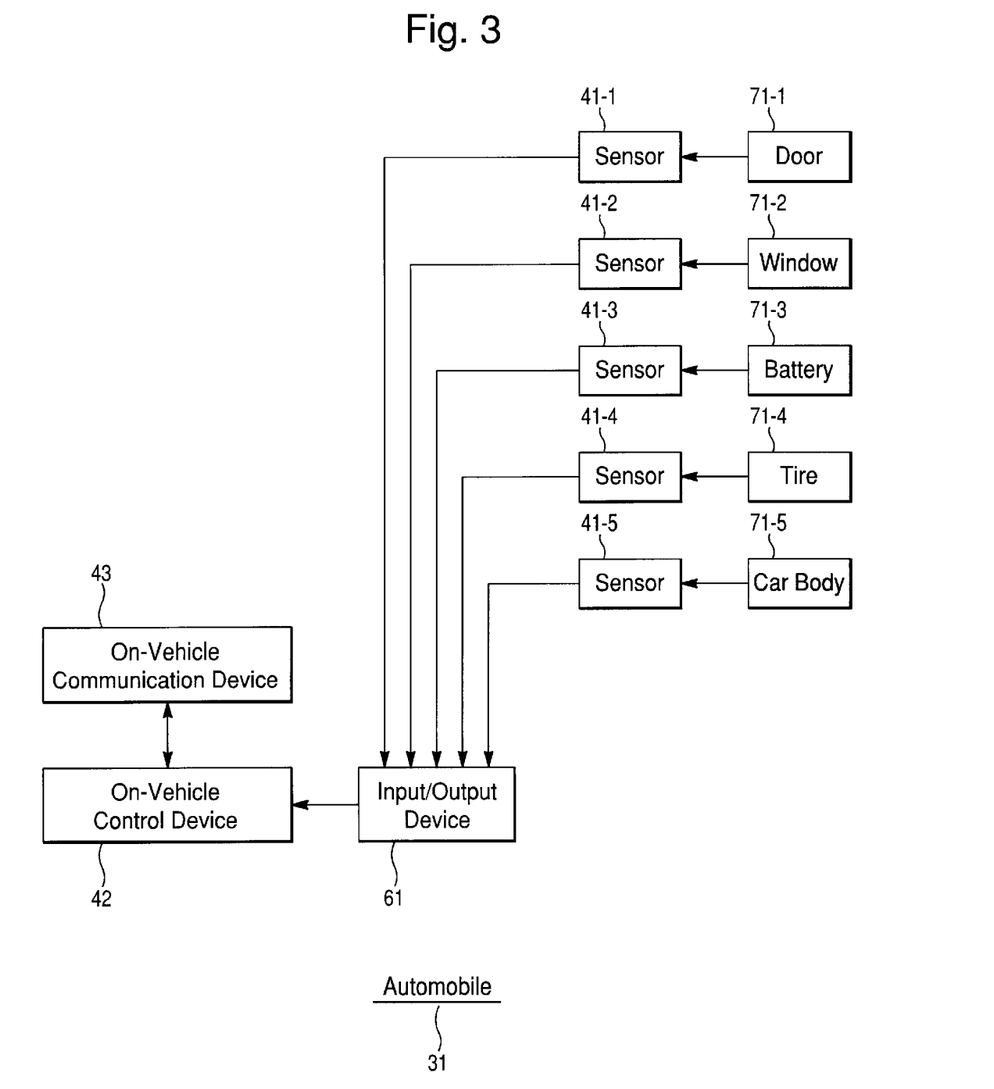
FIG. 3 is a block diagram showing a structural example of a security apparatus of a vehicle of FIG. 2.

FIG. 3 shows a more detailed structural example of the security apparatus installed in the automobile 31. In this example, sensors 41-1 to 41-5 are provided as the sensor 41. These sensors 41-1 to 41-5 are respectively connected to a door 71-1, a window 71-2, a battery 71-3, a tire 71-4, and a car body 71-5, and respectively detect that the door 71-1 is opened, the window 71-2 is opened, a supply current of the battery 71-3 becomes larger than a predetermined value (engine of the automobile 31 is started), the tire 71-4 is rotated, and the car body 71-5 is inclined, and output the detection results to an input/output device 61.

When receiving an abnormality detection signal from the sensors 41-1 to 41-5, the input/output device 61 outputs a corresponding signal to the on-vehicle control device 42. The on-vehicle control device 42 is constructed by, for example, a microcomputer or the like, and when the abnormality detection signal is inputted from the input/output device 61, the on-vehicle control device controls the on-vehicle communication device 43, so that the communication device notifies the center apparatus 33 of the abnormality by wireless from a near base station (not shown) through the communication network 34.

The center apparatus 33 is constructed, for example, as shown in FIG. 4. In this example, an instruction from an operator, inputted through a keyboard 81, a mouse 82 or the like, is inputted to the center control device 51 through an input/output bus 85. When receiving a security mode of the automobile 31 through the center communication device 52, the center control device 51 constructed by a microcomputer or the like supplies it to a storage device 83 through the input/output bus 85 so that it is stored. This storage device 83 is constructed by, for example, a hard disk, a nonvolatile semiconductor memory or the like. Predetermined information is displayed on a CRT 84.

The portable telephone 32 is constructed, for example, as shown in FIG. 5. An input portion 91 is constructed by a ten-key, and other switches and buttons, and supplies a signal corresponding to an operation from the user to a control portion 92 through a bus 90. The control portion 92 constructed by a microcomputer or the like controls respective portions in response to instructions from the input portion 91. A communication portion 93 communicates with the center apparatus 33 by wireless through the communication network 34 from a near base station.

A display portion 94 is constructed by, for example, an LCD (Liquid Crystal Display) or the like, and displays various messages or the like. A speaker 95 outputs a voice from a person on the other end of the line. A microphone 96 gets a voice of the user for transmission to the person on the other end of the line.

In the antitheft system, the user who desires to prevent the automobile from being stolen registers the user himself with the center apparatus 33, and receives assignment of an ID and a password in advance. The center apparatus 33 charges the user a predetermined service fee in accordance with the assignment. After receiving the assignment of the ID and the password, the user accesses the center apparatus 33 and registers the security mode of the automobile 31.

Next, the registration processing of the security mode will be described with reference to flowcharts of FIG. 6 and FIG. 7. FIG. 6 shows an operation of the portable telephone 32 and FIG. 7 shows an operation of the center apparatus 33 corresponding to that.

First, at step S1, the user operates the input portion 91 to input URL (Uniform Resource Locator) of the center apparatus 33, and accesses the center apparatus 33.

That is, when an instruction to access the center apparatus 33 is issued from the input portion 91, the control portion 92 controls the communication portion 93 so that the communication portion accesses the center communication device 52 of the center apparatus 33 through the communication network 34.

As described later, in response to this access, the center control device 51 of the center apparatus 33 requests the input of the ID and the password (step S12 of FIG. 7). Then, to this request, the user inputs the ID and the password previously assigned to the user himself by operating the input portion 91. When the ID and the pass word are inputted, the control portion 92 causes, at step S2, the communication portion 93 to transmit these to the center apparatus 33 through the communication network 34.

In the case where the ID and the password are proper, the center control device 51 of the center apparatus 33 requests the input of the security mode (step S15 of FIG. 7). Then, the user operates the input portion 91 to input an instruction to make the security mode on or an instruction to make the security mode, which has been already made on, off. When the on or off instruction of the security mode is inputted from the input portion 91, the control portion 92 controls, at step S3, the communication portion 93, and requests the center apparatus 33 to make the security mode on or off.

In accordance with the operation as described above, the center apparatus 33 executes the processing as shown in the flowchart of FIG. 7.

That is, at first, the center control device 51 waits, at step S11, until it receives the access from the portable telephone 32, and when it judges that the access is received, it requests, at step S12, the portable telephone 32 to input the ID and the password. On the basis of this request, since the ID and the password are transmitted from the portable telephone 32 at the step S2 of FIG. 6 as described above, the center control device 51 waits until the ID and the password are received at step S13, and when they are received, the procedure proceeds to step S14, and it is judged whether or not the received ID and the password are proper. That is, the storage device 83 stores a corresponding table of IDs and passwords previously assigned to respective users. The center control device 51 refers to the corresponding table of this storage device 83, and judges whether or not the ID and the password received at the step S13 are proper.

In the case where the received ID and the password are not proper (in the case where they do not coincide with the ID and the password of the corresponding table stored in the storage device 83), the procedure proceeds to step S18, the center control device 51 executes an error processing, and the procedure is returned to the step S11.

That is, in this case, since the user does not register the user himself with the center apparatus 33 in advance or erroneously inputs the ID or the password, the user again executes the access processing to the center apparatus 33.

At the step S14, in the case where the ID and the password are proper, the procedure proceeds to step S15, and the center control device 51 requests the portable telephone 32 to input the security mode. As described with reference to FIG. 6, in response to this request, the user inputs the security mode at the step S3 and transmits it. Then, the center control device 51 waits until the security mode is received at step S16, and when received, the procedure proceeds to step S17 and the received security mode is registered in the storage device 83.

In this way, the on or off state of the security mode set by the user of the portable telephone 32 is registered in the storage device 83.

For example, when starting the use of the automobile 31 in the morning, the user registers the off state of the security mode, and when ending the use of the vehicle at night, the user registers the on state of the security mode.

Figure 8:
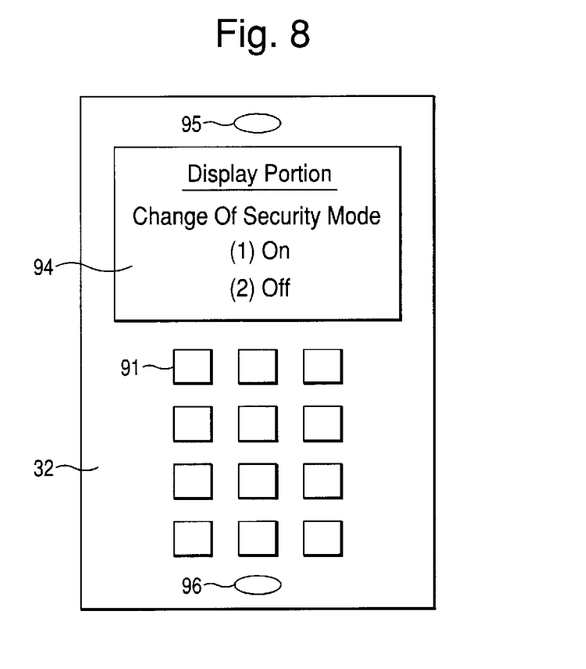
FIG. 8 is a view showing a display example at the time of setting of a security mode of the portable telephone of FIG. 2.

FIG. 8 shows an example of GUI displayed on the display portion 94 of the portable telephone 32 in response to the input request of the security mode at the step S15. In this example, the on state of the security mode corresponds to No. 1, and the off state corresponds to No. 2. Accordingly, when making the security mode on, the user operates the key of No. 1 among keys constituting the input portion 91, and operates the key of No. 2 when the off instruction is given.

Figure 9:
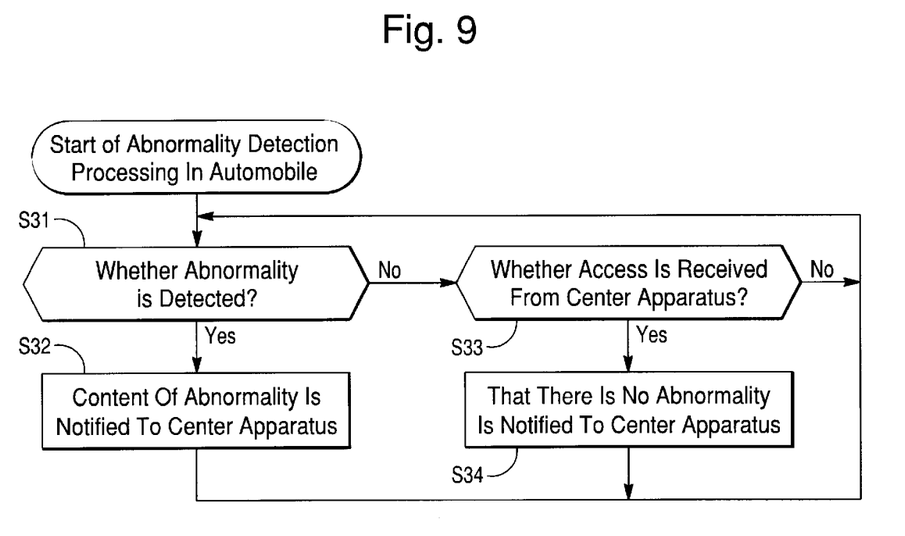
FIG. 9 is a flowchart for explaining an abnormality detection processing in an automobile of FIG. 2.

Next, the abnormality detection processing executed by the on-vehicle control device 42 of the automobile 31 will be described with reference to a flowchart of FIG. 9.

At first, the on-vehicle control device 42 judges at step S31 whether or not abnormality is detected. That is, as described above, when the door 71-1 is opened, the sensor 41-1 detects the state and notifies the input/output device 61 of that. Besides, when the window 71-2 is opened, the sensor 41-2 notifies the input/output device 61 of that. When the current supplied from the battery 71-3 becomes a reference value or higher (for example, when the engine of the automobile 31 is started), the sensor 41-3 notifies the input/output device 61 of that. Similarly, when the tire 71-4 is rotated, the sensor 41-4 notifies the input/output device 61 of that, and when an angle of the car body 71-5 is inclined by a predetermined reference value or higher, the sensor 41-5 notifies the input/output device 61 of that. When detection signals from these sensors 41-1 to 41-5 are inputted, the input/output device 61 supplies corresponding signals to the on-vehicle control device 42.

Accordingly, the on-vehicle control device 42 monitors the output of the sensors 41-1 to 41-5 through the input/output device 61, so that it can judge whether or not the abnormality is detected.

In the case where it is judged at the step S31 that the abnormality is detected, the procedure proceeds to step S32, and the on-vehicle control device 42 controls the on-vehicle communication device 43 so that the content of the abnormality is notified to the center apparatus 33 from a near base station through the communication network 34. The processing of the center apparatus 33 in the case where such notification is received, will be described later with reference to a flowchart of FIG. 10.

On the other hand, in the case where it is judged at the step S31 that the abnormality is not detected, the procedure proceeds to step S33, and the on-vehicle control device 42 judges whether or not access is made from the center apparatus 33. In the case where the access is not made, the procedure is returned to the step S31 and the processings subsequent to that are repeatedly executed.

In the case where it is judged at the step S33 that the access is made from the center apparatus 33, the procedure proceeds to step S34, and now, since notification of abnormality is not made from the respective sensors 41-1 to 41-5, the on-vehicle control device 42 controls the on-vehicle communication device 43 to notify the center apparatus 33 that it is normal (abnormality is not detected).

After the processings of the steps S32 and S34, the procedure is again returned to the step S31, and the processings subsequent to that are repeatedly executed.

Next, the abnormality detection processing of the center apparatus 33 will be described with reference to the flowchart of FIG. 10.

At first, the center control device 51 of the center apparatus 33 judges at step S41 whether or not notification of abnormality is received from the on-vehicle communication device 43 of the automobile 31, and in the case where it is judged that the notification of the abnormality is received, the procedure proceeds to step S42, and the center control device judges whether or not the security mode of the automobile 31 notifying the abnormality is now made on. This judgement is carried out on the basis of the memory stored in the storage device 83. In the case where it is judged that the security mode is not made on, the procedure is returned to the step S41, and the processings subsequent to that are repeatedly executed.

That is, for example, in the case where the user uses the automobile 31, the security mode is made off as described above. Accordingly, even if the door is opened, the engine is started, the window is opened, the tire is rotated, or the car body is inclined and that is notified, the center control device 51 does not carry out a specific processing.

On the other hand, in the case where it is judged at the step S42 that the security mode is made on, the procedure proceeds to step S43, and the center control apparatus 51 notifies a person, who is registered in the storage device 83 as a contractor of the automobile 31 notifying the abnormality, of the content of the abnormality. In the case where the notified party is previously registered as the portable telephone 32 of the user of the automobile 31, the center control apparatus 51 controls the center communication device 52 to notify the portable telephone 32 of the content of the abnormality through the communication network 34 by, for example, electronic mail or the like. By this, for example, in the case where the sensor 41-1 detects that the door 71-1 is opened, that is notified to the portable telephone 32 by electronic mail.

When receiving this notification through the communication portion 93, the control portion 92 of the portable telephone 32 causes the message of the electronic mail to be displayed on the display portion 94. By this, the user of the portable telephone 32 can know that the door 71-1 of the automobile is now opened. Of course, in addition to this, according to the content of the abnormality, as described above, notification is made such that the window 71-2 is opened, the battery 71-3 supplies a large current (engine is started), the tire 71-4 is rotated, the car body 71-5 is much inclined, and the like.

On the basis of the content of the notification, the user judges whether or not there is a person now using the automobile 31, for example, in the case where the automobile 31 is lent to another person, or in the case where the user himself uses the automobile 31 and forgot to make the security mode off, since there is no abnormality now, the user executes the processing to make the security mode off. That is, the processing shown in the flowchart of FIG. 6 is executed in the portable telephone 32, and on the basis of that, the processing shown in the flowchart of FIG. 7 is executed in the center apparatus 33.

As a result, the security mode stored in the storage device 83 of the center apparatus 33 is changed to be off.

Then, the center control device 51 judges at step S44 whether or not the security mode is changed to be off, and in the case where it is judged that the security mode is changed to be off, the procedure is returned to the step S41, and the processings subsequent to that are repeatedly executed.

On the other hand, now, in the case where the user himself does no use the automobile 31, and the automobile 31 is not lent to another person, it is judged that abnormality occurs. Then, in this case, the user goes to the place where the automobile 31 is parked, and judges whether or not there is abnormality. The details of the processing of this case will be described later with reference to a flowchart of FIG. 11.

In the case where the abnormality occurs, the user does not change the security mode to be off. Thus, it is judged at the step S44 that the security mode is not changed to be off, and the center control device 51 judges at step S45 whether or not a previously set definite time has elapsed from the reception of the notification of the abnormality, and if the definite time has not elapsed, the procedure is returned to the step S43, and the center control device again executes the processing to notify the contractor of the content of the abnormality.

As a result, the content of the abnormality is again notified to the user of the automobile 31. In this way, since the notification has been made plural times until the definite time elapses, for example, even in the case where the user happened to be unable to respond to the notification when the user was notified at the last time, it becomes possible to certainly notify the user of the abnormality.

In the case where it is judged at the step S45 that the definite time has elapsed from the reception of the notification of the abnormality, the center control apparatus 51 executes, at step S46, a processing to notify a security company which guards the automobile 31 and is memorized in the storage device 83 in advance. That is, at this time, the center control device 51 controls the center communication device 52 to notify the not-shown security company through the communication network 34 that the abnormality occurs. On the basis of the notification, a member of the security company goes to the place where the automobile 31 is parked, and takes a suitable step.

The security mode can be changed only by the user who knows the ID and the password. Accordingly, even if a person trying to steal the automobile 31 gets into the automobile 31 and tries to cancel the security mode, the mode can not be cancelled and the foregoing processings are executed. As a result, it is possible to certainly prevent the theft.

On the other hand, in the case where it is judged at the step S41 that the notification of the abnormality is not received, the procedure proceeds to step S47, and the center control device 51 judges whether or not the security mode is on. In the case where the security mode is not on, the procedure is returned to the step S41 and the processings subsequent to that are repeatedly executed.

In the case where it is judged at the step S47 that the security mode is on, the procedure proceeds to step S48, and the center control device 51 judges whether or not the previously set definite time has elapsed. This time is previously set to, for example, three minutes. The shorter this time is made, the quicker the abnormality can be detected. However, if the time is made too short, the load at the side of the center apparatus 33 becomes heavy. Then, in view of the balance of both, an adequate time is suitably set.

In the case where the definite time has not elapsed (in the case where three minutes has not elapsed from the last notification in the state where abnormality is not notified), the procedure is returned to the step S41, and the processings subsequent to that are repeatedly executed.

In the case where it is judged at the step S48 that the definite time has elapsed (in the case where it is judged that three minutes have elapsed from the notification that there is no abnormality), the procedure proceeds to step S49, the center control device 51 controls the center communication device 52 so that it accesses the on-vehicle communication device 43 of the automobile 31. The accessed party is also previously registered in the storage device 83 at the time of registration of the user. When receiving this access, the on-vehicle control device 42 of the automobile 31 notifies the center apparatus 33 that it is normal at the step S34 of FIG. 9 as described above.

Then, the center control device 51 judges at step S50 whether or not notification of normality is made from the on-vehicle communication device 40 of the automobile 31, and in the case where it is judged that the notification of the normality is made, the procedure is returned to the step S41 and the processings subsequent to that are repeatedly executed.

In the case where it is judged at the step S50 that the on-vehicle communication device 43 of the automobile 31 does not notify that there is no abnormality in response to the access, the center control device 51 notifies, at the step S43, the contractor of the content of the abnormality. Hereinafter, similar processings to the above case are executed.

In this way, even if the sensors 41-1 to 41-5 installed in the automobile 31 or the on-vehicle communication device 43 is removed from the automobile 31 or is made inoperative, if there is no response in three minutes, the side of the center apparatus 33 judges that abnormality occurs, so that it becomes possible to more certainly prevent the theft.

Incidentally, in the above example, although the side of the center apparatus 33 accesses the automobile 31 at definite time intervals, it is also possible to make the side of the automobile 31 access the side of the center apparatus 33 at definite time intervals.

Next, the processing of the case where the user of the automobile 31 receives the notification of the abnormality from the center apparatus 33, will be described with reference to the flowchart of FIG. 11.

First, at step S61, when receiving notification of abnormality from the center apparatus 33 through the communication portion 93, the control portion 92 of the portable telephone 32 outputs this to the display portion 94 and causes this to be displayed. The user looks at the display of the display portion 94, and at step S62, the user goes to the place where the automobile 31 is parked and checks the state of the automobile. Then, it is judged at step S63 whether or not the vehicle is safe. In the case where it is judged at the step S63 that the vehicle is not safe, that is, in the case where the user himself or another person does not use the automobile 31, this means that the automobile 31 is stolen, so that the procedure proceeds to step S64 and takes a step to notify the police, or the like.

When the user himself uses the automobile 31, the user permits another person to use it, or an erroneous operation of the sensor 41 occurs, since the automobile 31 is safe, the procedure proceeds from the step S63 to step S65, and the processing shown in the flowchart of FIG. 6 is executed, so that the security mode is made off. However, for example, when the sensor 41 carries out the erroneous operation, it is necessary to again make the security mode on. Then, the user judges at step S66 whether or not it is necessary to again make the security mode on, and if necessary, the procedure proceeds to step S67, and the security mode is made on. If not necessary, the processing is ended.

Incidentally, in the present specification, the steps describing a program recorded on a recording medium naturally include the processings executed in time series along the recited sequence, and also include the processings which are not always executed in time series but are executed in parallel or separately.

Besides, in the present specification, the system indicates the whole apparatus constituted by a plurality of devices.

As described above, according to the present invention, since the side of the center apparatus manages the security mode, it is possible to realize the system which can prevent a vehicle from being stolen at low cost and more certainly.

What is claimed is:

1. An antitheft system comprising a portable communication terminal and a center apparatus for taking charge of a vehicle against theft, wherein the portable communication terminal comprises:
   access means for accessing the center apparatus; and
   instruction means for instructing the center apparatus to register a security mode, the security mode indicating whether security for the vehicle is on or off, and
   wherein the center apparatus comprises:
      first reception means for receiving an instruction to register the security mode from the instruction means;
      registration means for registering the security mode on the basis of the instruction received by the first reception means;
      second reception means for receiving an abnormality detection signal from the vehicle;
      judgment means for judging the security mode registered in the registration means when the second reception means receives the abnormality detection signal; and
      notification means for notifying the portable communication terminal of abnormality on the basis of a judgment result by the judgment means, wherein the access means, center apparatus, instruction means, first reception means, registration means, second reception means, judgment means, and notification means are external to and separate from the vehicle.

2. A portable communication terminal used in an antitheft system for preventing a vehicle from being stolen, comprising:
   access means for accessing a center apparatus; and
   instruction means for instructing the center apparatus to register a security mode, the security mode indicating whether security for the vehicle is on or off, wherein the access means, center apparatus and instruction means are external to and separate from the vehicle, and wherein the instructing means is configured to directly set the security mode to the center apparatus.

3. A portable communication terminal according to claim 2, further comprising:
   reception means for receiving notification of an abnormality from the center apparatus.

4. A communication method of a portable communication terminal used in an antitheft system for preventing a vehicle from being stolen, the communication method comprising:
   accessing a center apparatus using an access means; and
   instructing the center apparatus using an instructing means to register a security mode, the security mode indicating whether security for the vehicle is on or off, wherein the access means, center apparatus and instruction means are external to and separate from the vehicle, and wherein the instructing means is configured to directly set the security mode to the center apparatus.

5. An antitheft apparatus used in an antitheft system for preventing a vehicle from being stolen, comprising:
   a first reception component for receiving a request for registration of a security mode, the security mode indicating whether security for the vehicle is on or off;
   a registration component for registering the security mode on the basis of the request received by the first reception component;
   a second reception component for receiving an abnormality detection signal from the vehicle;
   a judgment component for judging the security mode registered in the registration component when the second reception component receives the abnormality detection signal; and
   a notification component for notifying a user of abnormality on the basis of a judgment result by the judgment component, wherein the first reception component, registration component, second reception component, judgment component, and notification component are external to and separate from the vehicle.

6. An antitheft apparatus according to claim 5, further comprising detection means which communicates with a communication device installed in the vehicle at a predetermined period and detects a state of the vehicle.

7. An antitheft method used in an antitheft system for preventing a vehicle from being stolen, the method comprising:
   receiving a request for registration of a security mode using a first reception component, the security mode indicating whether security for the vehicle is on or off;
   registering the security mode using a registration component on the basis of the request received in the first reception step;
   receiving an abnormality detection signal using a second reception component from the vehicle;
   judging the security mode using a judgement component when the abnormality detection signal is received; and
   notifying a user of abnormality using a notification component on the basis of a judgment result from the step of judging the security mode, wherein the first reception component, registration component, second reception component, judgment component, and notification component are external to and separate from the vehicle.

8. An antitheft method of an antitheft system comprising a portable communication terminal and a center apparatus for taking charge of a vehicle against theft, wherein an antitheft method of the portable communication terminal comprises:
   accessing the center apparatus using an accessing means; and
   instructing the center apparatus using an instruction means to register a security mode, the security mode indicating whether security for the vehicle is on or off, and
   wherein an antitheft method of the center apparatus comprises:
   receiving an instruction using a first reception means to register the security mode on the basis of the instruction step;
   registering the security mode using a registration means on the basis of the instruction received at the first reception step;
   receiving an abnormality detection signal using a second reception means from the vehicle;
   judging the mode registered at the registration step using a judgement means when the abnormality detection signal is received at the second reception step; and
   a notification step of notifying the portable communication terminal of abnormality using a notification component on the basis of a judgment result at the judgment step, wherein the access means, center apparatus, instruction means, first reception means, registration means, second reception means, judgment means, and notification means are external to and separate from the vehicle.

* * * * *